United States Patent [19]

Miki et al.

[11] Patent Number: 4,631,982
[45] Date of Patent: Dec. 30, 1986

[54] ELECTRONICALLY CONTROLLED AUTOMATIC TRANSMISSION CONTROL SYSTEM

[75] Inventors: Nobuaki Miki; Yoshikazu Sakaguchi; Kozo Mandokoro, all of Anjo; Seitoku Kubo, Toyota, all of Japan

[73] Assignees: Aisin-Warner K.K., Anjo; Toyota Jidosha K.K., Toyota, both of Japan

[21] Appl. No.: 798,726

[22] Filed: Nov. 18, 1985

[51] Int. Cl.[4] .......................................... B60K 41/06
[52] U.S. Cl. ...................................... 74/869; 74/866; 74/862
[58] Field of Search ................ 74/862, 865, 866, 867, 74/868, 869

[56] References Cited

U.S. PATENT DOCUMENTS

| | | | |
|---|---|---|---|
| 3,738,199 | 6/1973 | Kubo et al. | 74/869 |
| 3,937,108 | 2/1976 | Will | 74/869 X |
| 4,308,764 | 1/1982 | Kawamoto et al. | 74/869 X |
| 4,346,626 | 8/1982 | Kawamoto | 74/867 X |
| 4,346,627 | 8/1982 | Kawamoto et al. | 74/868 X |
| 4,367,528 | 1/1983 | Kawamoto et al. | 74/866 X |
| 4,369,671 | 1/1983 | Matsumoto et al. | 74/869 X |

FOREIGN PATENT DOCUMENTS

| | | | |
|---|---|---|---|
| 0149455 | 11/1980 | Japan | 74/869 |
| 0037140 | 3/1982 | Japan | 74/867 |

Primary Examiner—Kenneth J. Dorner
Assistant Examiner—Joseph M. Rolnicki
Attorney, Agent, or Firm—Cooper, Dunham, Griffin & Moran

[57] ABSTRACT

An electronically controlled automatic transmission control system for controlling an automatic transmission for a vehicle, comprising an electronic controller which receives functions on the basis of input signals corresponding to the running conditions of the vehicle to control a hydraulic controller including a fluid pressure source, shift control valves for changing over the connection of the fluid pressure source to the respective hydraulic servomotors of frictional engaging mechanisms which controls the operation of the components of a gear train included in the automatic transmission, solenoid valves adapted to be controlled by the electronic controller to change input signal pressures to the shift control valves and a manual selector valve having a spool capable of moving through predetermined set positions corresponding to the shift positions of the manual shift lever of the vehicle, in which the input signal pressure is supplied to one of the shift control valves, namely, 1-2 shift control valve, when the spool of the manual selector valve is shifted to a position corresponding to the neutral position, in order to improve the delayed operation of the automatic transmission in shifting the automatic transmission from the neutral or the parking position to the drive position.

2 Claims, 5 Drawing Figures

ELECTRONICALLY CONTROLLED AUTOMATIC TRANSMISSION CONTROL SYSTEM

This is a continuation of application Ser. No. 498,852, filed May 27, 1983, now abandoned.

BACKGROUND OF THE INVENTION

1. Field of the Invention

The present invention relates to an electronically controlled automatic transmission control system.

2. Description of the Prior Art

An electronically controlled automatic transmission control sytem consists of an electronic controller which receives the running conditions, such as the running speed of the vehicle, the degree of throttle opening, the torque of the output shaft and the difference in revolving rate between the input shaft and the output shaft of a fluid coupling, as input signals and provides output signals corresponding to those input signals and a hydraulic controller including a fluid pressure source, hydraulic servomotors adapted to engage, release or fix the components of the gear train (gear type transmission mechanism) to change the reduction ratio, shift control valves for changing over the connection of the fluid pressure source to the hydraulic servomotors, solenoid valves adapted to be controlled by the electronic controller so as to operate the shift control valves by changing the input signal pressures applied to the shift control valves for shift control and a manual selector valve which is movable through predetermined set positions, namely, a neutral position (N-position), a drive position (D-position) and a reverse position (R-position) and adapted to be controlled manually by the driver to change over the connection of the fluid pressure source to the predetermined shift valves or the predetermined hydraulic servomotors.

In a conventional control system of this type, since the shift control valves are not required to be controlled while the manual selector valve is placed at the N-position, no input signal pressure is applied to the shift control valves, whereas an input signal pressure is applied to the shift control valves upon placing the manual selector valve at the D-position. Accordingly, there has been a time lag between the shift of the manual selector valve from the N-position to the D-position for starting the vehicle and the application of an input fluid pressure for controlling the shift control valves, so that the start of the vehicle is delayed. Thus, a vehicle equipped with such a conventional automatic transmission has been accompanied by undesirable driving feeling due to delayed response, which is peculiar to a vehicle equipped with an automatic transmission.

SUMMARY OF THE INVENTION

It is an object of the present invention to provide an electronically controlled automatic transmission control system capable of starting the vehicle with a short time lag when the transmission is shifted from the N-position to the D-position to provide superior driving feeling.

The substance of the present invention resides in applying an input signal pressure to the 1-2 shift control valve with the manual selector valve placed at the N-position. The present invention will be described hereinafter with reference to an embodiment thereof shown in accompanying drawings.

DESCRIPTION OF THE PREFERRED EMBODIMENT OF THE INVENTION

Figure 1:
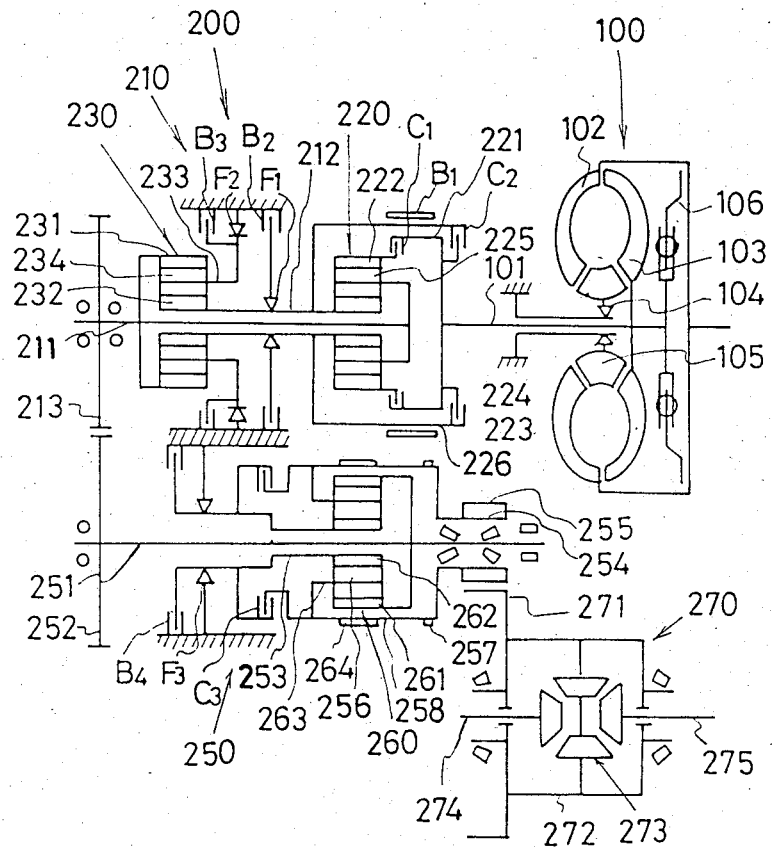
FIG. 1 is a diagrammatic view of an automatic transmission for a front-engine and front-drive vehicle.

FIG. 1 shows an automatic transmission for a front engine and front drive vehicle. The automatic transmission comprises a fluid coupling 100 and a gear train 200 consisting of a first underdrive transmission 210 connected coaxially to the output shaft 101 of the fluid coupling for three forward and one reverse speed change, a second underdrive transmission 250 connected in parallel to the first under drive transmission 210 for two forward speed change and a differential gear 270 connected to the output shaft of the second underdrive transmission 250.

The fluid coupling 100 is a torque converter having a pump impeller 102 connected to the output shaft of an engine, a turbine runnner 103 connected to the output shaft 101 and a stator 105 fixed to the casing of the automatic transmission by means of a one-way clutch 104 and equipped with a direct coupling clutch 106.

The first underdrive transmission includes an output shaft 211 disposed coaxially with the output shaft 101 of the fluid coupling 100 at the left end (directions are indicated on the drawings) thereof, a first planetary gear mechanism 220, a second planetary gear mechanism 230 and frictional engaging mechanisms, such as multiple disc clutches C1 and C2, a band brake B1, multiple disc brakes B2 and B3 and a one-way clutch, for engaging, releasing or fixing the components of those planetary gear mechanisms. The output shaft 101 of the fluid coupling 100 serves as the input shaft of the first underdrive transmission.

The first planetary gear mechanism 220 consists of a ring gear 222 coupled by means of the multiple disc clutch C1 with a cylinder 221 connected to the output shaft 101 of the fluid coupling 100, a sun gear 223 formed on the right end of a sungear shaft 212 rotatably receiving the output shaft 211 of the first underdrive transmission extending therethrough, a carrier 224 joined to the right end of the output shaft 211 and planet pinions 225 rotatably held on the carrier 224 and meshed with the ring gear 222 as well as with the sun gear 223. A drum 226 is fixed at the left side wall thereof to the sun gear shaft 212 so as to house the first planetary gear mechanism 220 therein. The opening right end of the drum 226 is coupled with the cylinder 221 by means of the multiple disc clutch C2. The drum 226 is capable of being fixed to the casing of the automatic transmission through the engagement of the circumference thereof with the band brake B1. The sun gear shaft 212 is fixed at the intermediate part thereof to the casing of the automatic transmission through the multiple disc brake B2, disposed in series with the one-way clutch F1.

The second planetary gear mechanism 230 consists of a ring gear 231 fixed to the left portion of the output shaft 211 of the first underdrive transmission, a sun gear 232 formed on the left end of the sungear shaft 212, a carrier 233 capable of being fixed to the casing of the automatic transmission through the one-way brake F2 and the multiple disc brake B3 connected in parallel to the one-way brake F2 and planet pinions 234 rotatably held on the carrier 233 and meshed with the sun gear 232 as well as the ring gear 231.

The output gear 213 of the first underdrive transmission 210 is fixed to the left end of the output shaft 211 of the first underdrive transmission and is engaged with an input gear 252 fixed to the left end of the input shaft 251 of the second underdrive transmission 250.

The second underdrive transmission 250 includes a third planetary gear mechanism 260 formed between the input shaft 251 disposed in parallel to the input and the output shafts of the first underdrive transmission and a hollow output shaft 254 rotatably mounted on the input shaft 251 extending therethrough and provided with an output gear 255 and frictional engaging mechanisms, such as a multiple disc clutch C3, a multiple disc brake B4 and a one-way brake F3, for engaging, releasing or fixing the components of the second underdrive transmission 250.

The third planetary gear mechanism 260 consists of a ring gear 261 fixed to the right end of the input shaft 251 of the second underdrive transmission 250, a sun gear 262 formed on the right end of a sun gear shaft 253 rotatably receiving the input shaft 251 therethrough and adapted to be fixed at the left end thereof to the casing of the automatic transmission through the brake B4 and the one-way brake F3 connected in parallel to the brake B4, a carrier 263 connected to a drum 258 housing the third planetary gear mechanism 260 and planet pinions 256 rotatably held on the carrier 263 and meshed with the ring gear 261 as well as with the sun gear 262. The drum 258 is connected at the right end thereof to the output shaft 254 and at the left end thereof to the left portion of the sun gear shaft 253 through the multiple disc clutch C3 and is provided on the circumference thereof with a governor driving gear 264 and a parking gear 257.

The differential gear 270 consists of a driving gear 271 engaged with the output gear 255 of the second underdrive transmission, a differential gear box 272, a differential gear mechanism 273 and output shafts 274 and 275 connected to the driving wheels respectively.

Figure 2:
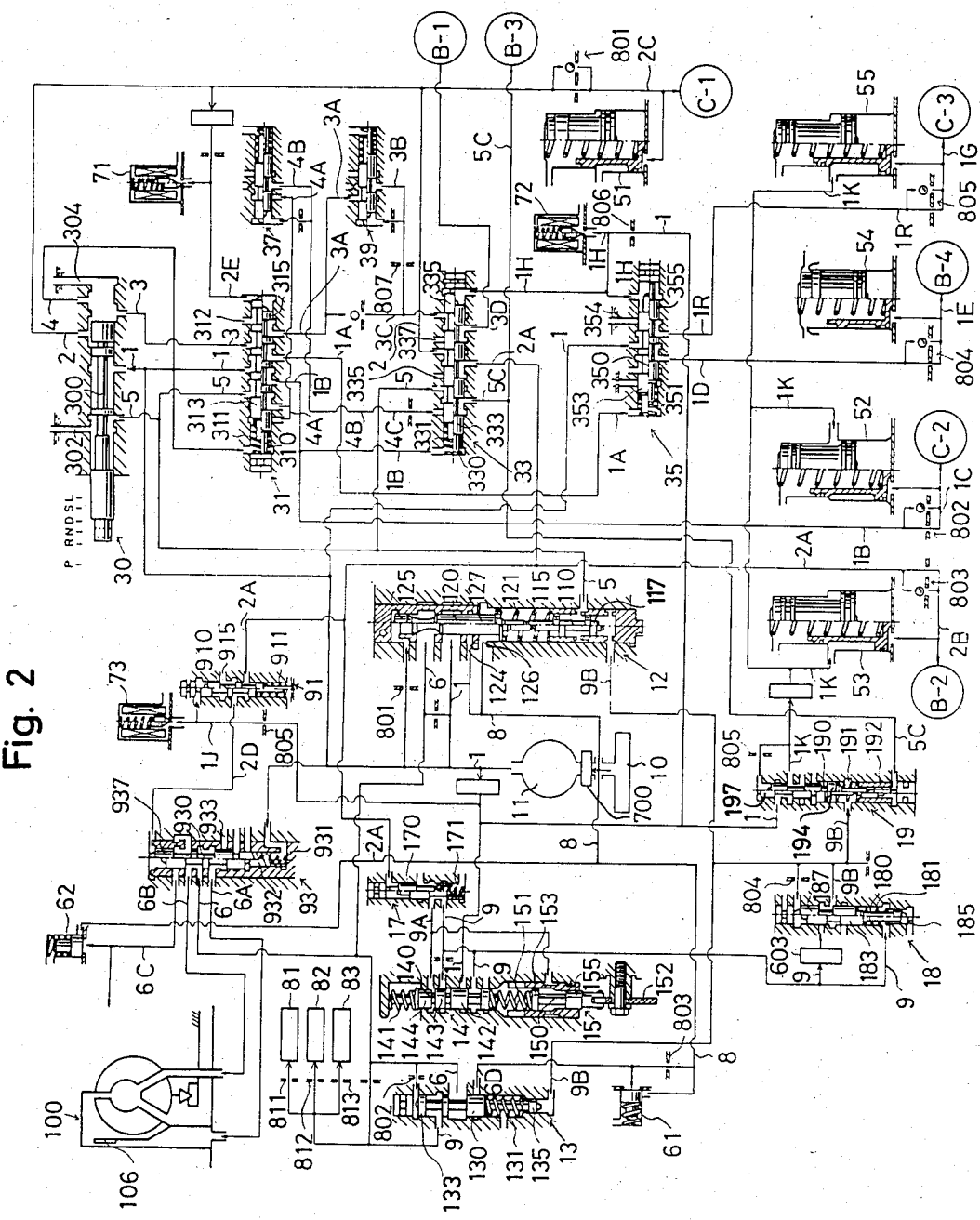
FIG. 2 is a circuit diagram of a hydraulic controller according to the present invention.

FIG. 2 is a circuit diagram of a hydraulic controller designed to control the reduction ratio of the gear train 200 shown in FIG. 1 by selectively supplying working fluid to and discharging working fluid from hydraulic servomotors C-1, C-2, C-3, B-1, B-2, B-3 and B-4 which operate the clutches C1, C2 and C3 and brakes B1, B2, B3 and B4, respectively, of the gear train 200.

The hydraulic controller comprises an oil sump 10, an oil pump 11, a primary regulator valve 12, a secondary regulator valve 13, a throttle valve 14, a kick-down valve 15, a cutback valve 17, a throttle modulator valve 18, an accumulator control valve 19, a manual selector valve 30, a 2-3 shift control valve 31, a 1-2 shift control valve 33, a 3-4 shift control valve 35, a low coast modulator valve 37, a 2nd coast modulator valve 39, a lockup signal valve 91, a lockup control valve 93, accumulators 51, 52, 53, 54 and 55, a draining pressure relief valve 61, a cooler by-pass valve 62, a first solenoid valve 71, a second solenoid valve 72, a third solenoid valve 73, a flow control valve formed of a combination of an orifice with a check valve and an orifice, check valves, orifices placed in fluid lines at appropriate positions respectively and an oil strainer.

The oil pump 11 is driven by the engine to pump up working fluid from the oil sump 10 through the oil strainer 700 and to discharge pressurized working fluid into a line 1.

The primary regulator valve 12 has a spool 120, a spring 121 disposed on one axial side of the spool 120 and a regulator plunger 110 located on the same side of the spool 120 in series with the spring 121. The spool 120 has a top land 125 ("top", "bottom" or any direction is as indicated on the drawing) to which is fed back the output pressure via the orifice 801 and a bottom land 127 which regulates the area of a passage connecting lines 1 and 6 and blocks drain ports 124 and 126 leaving minute gaps in the drain ports 124 and 126 respectively. The regulator plunger 110 has a larger diameter upper land 115 which receives a line pressure applied via a line 5 and a smaller diameter lower land 117 which receives a throttle modulator pressure applied thereto via a line 9B. The regulator plunger 110 is moved up by the line pressure and the modulator pressure to push the spool 120 upward whereby the spool 120 is shifted by the resilience of the spring 121 and the pressure of the plunger 110 which act on the spool 120 in one direction and the output pressure fed back thereto (the line pressure in line 1) which acts on the spool 120 in the other direction to regulate the area of the passage connecting the lines 1 and 6, so that the pressure of the working fluid discharged into the line 1 by the oil pump is regulated at a line pressure corresponding to the input pressures applied to the spool 120. Surplus working fluid is supplied to the line 6 and unnecessary surplus working fluid is drained through the drain ports 124 and 126 and is returned to the oil sump 10 through a line 8.

The secondary regulator valve 13 has a spool 130 and a spring 131 located on one side of the spool 130. The position of the spool 130 is dependent on a throttle modulator pressure applied to the smaller diameter bottom land 135 via the line 9B and the resilience of the spring 131 which act on the spool 130 in one direction and the output pressure (pressure in the line 6) applied to the top land 133 via the orifice 802 and acting in the other direction. The spool 130 regulates the area of a passage connecting the line 6 and a lubricating line 9 and that of a passage connecting the line 6 and a drain line 6D corresponding to those input pressures to regulate the secondary pressure in the line 6 at a predetermined fluid coupling operating pressure, to regulate the lubricating pressure in the line 9 and to discharge surplus working fluid into the line 6D. The working fluid discharged into the line 6D flows into a return line 8 connected to the oil sump 10 via the orifice 803, while the working fluid flows from the line 6D to the line 8 through the relief valve 61 disposed in parallel to the orifice 803 when the pressure in the line 6D is excessively high. The working fluid for lubrication supplied to the line 9 is supplied to lubricating parts 81, 82 and 83 through the orifices 811, 812 and 813 respectively.

The throttle valve 14 has a spool 140 having a larger diameter land 142, a medium diameter land 143 and a smaller diameter land 144 and a spring 141 disposed on one side of the spool 140. The working position of the spool 140 is dependent on the resilience of the spring 141, the differential force of the output pressure (the throttle pressure in the line 9) fed back via the orifice and applied both to the land 142 and to the land 143 and the differential force of a cutback pressure provided by the cutback valve 17 and applied to the lands 143 and 144 which act on the spool in one direction and a pushing force corresponding to the position of the accelerator pedal or the equivalent transmitted through the spool 150 of the kick-down valve 15 connected in series to the spool 140 through a spring 151 which acts on the spool 140 in the other direction. The throttle valve 14 regulates the line pressure applied thereto through the line 1 at a throttle pressure corresponding to the degree of throttle opening according to those input pressures applied thereto and the position of the accelerator pedal and then supplies the throttle pressure to the line 9.

The kick-down valve 15 has a spool 150 having a larger diameter top land 153 and a smaller diameter bottom land 154 and linked with the accelerator pedal. The spool 150 is pushed upward by a pushing force applied thereto by a throttle cam 152 which turns corresponding to the position of the accelerator pedal and the cutback pressure supplied between the top and the bottom lands to push the spool 140 of the throttle valve 15 upward by a force correspoding to the degree of throttle opening and the cutback pressure to increase the throttle pressure provided by the throttle valve.

The cutback valve 17 has a spool 170 and a spring 171 disposed on one side of the spool 170 for biasing the spool in one direction. When the line pressure is applied to the land through a line 2A against the resilience of the spring 171, the spool 170 allows the line 9A to communicate with the line 9, whereby a cutback pressure is supplied to the line 9A.

The throttle modulator valve 18 has a spool 180 and a spring 181 disposed on one side of the spool 180. The resilience of the spring 181 and a differential force of the throttle pressure applied to the effective area of the intermediate land, namely, the difference in area between the intermediate land 183 and the bottom land 185, act on the spool 180 in one direction, while the output pressure (the throttle modulator pressure in the line 9) is fed back and applied to the large diameter land 187 in the other direction. The throttle modulator valve 18 receives the throttle pressure from the line 9 through a strainer 603 and supplies the throttle modulator pressure to the line 9B.

The accumulator control valve 19 has a spool 190, a spring 191 disposed on one side of the spool 190 and a small diameter plunger 192 disposed adjacently to and in series with the spring 191. The position of the spool 190 is dependent on the resilience of the spring 191, the force produced by the throttle modulator pressure supplied in the space between the bottom land 194 of the spool 190 and the plunger 192 through the line 9B and the force of the line pressure applied to the plunger 192 through a line 5C which act on the spool in one direction and the force of the output pressure, namely, an accumulator control pressure, fed back and applied to the top land 197 of the spool 190 through the orifice 805 which acts in the other direction. The accumulator control valve 19 regulates the line pressure supplied thereto through the line 1 to supply an accumulator control pressure to a line 1K.

The manual selector valve 30 has a spool 300 linked with a shift lever disposed beside the driver's seat. The spool 300 is movable through a parking position (P-position), a neutral position (N-position), a reverse position (R-position), a drive position (D-position), a second-speed position (S-position) and a low-speed position (L-position). When the spool 300 is shifted selectively to those positions, the line 1 is connected to the lines 2 to 5 as shown in TABLE 1.

TABLE 1

|        | P | R | N | D | S | L |
|--------|---|---|---|---|---|---|
| Line 2 | X | X | X | O |   | O |
| Line 3 | X | X | X | X |   | O |
| Line 4 | X | X | X | X | X | O |
| Line 5 | X | O | X | X | X | X |

In TABLE 1, symbols "X" and " " designate interruption and connection respectively.

The 2-3 shift control valve 31 has a spool 310 and a spring 311 disposed on one side of the spool 310. The position of the spool 310 is dependent on the resilience of the spring 311 and the force of the line pressure applied to the left land 313 of the spool 310 which act on the spool in one direction and the force of a solenoid pressure in a line 2E which is controlled by the first solenoid valve 71 and applied to the right land 315 of the spool which acts on the spool 310 in the other direction.

(a) When the line 4 is connected to the drain port 304 of the manual selector valve 30, whereby the line 4 is drained and no line pressure is prevailing therein, if the first solenoid valve 71 is open and the solenoid pressure in the line 2E is in a low level, the spool 310 is located at the right end position and thereby the lines 1 and 1A, the lines 3 and 3A, the lines 5 and 1B, and the lines 4 and 4A are interconnected respectively, so that the first and second speed condition of the hydraulic circuit is established, whereas if the first solenoid valve 71 is closed and hence the solenoid pressure in the line 2E is in a high level, the spool 310 is located at the left end position and thereby the lines 1 and 1B, the lines 3 and 1A, the lines 5 and 4A, and the line 3A and the drain port 312 are interconnected respectively, so that the third and the fourth speed condition of the hydraulic circuit is established.

(b) When the line pressure is applied to the left land 313 of the spool 310 through the line 4, the spool 310 is retained at the right end position.

The 1-2 shift control valve 33 has a spool 330 and a spring 331 disposed on one side of the spool 330. The position of the spool 330 is dependent on the resilience of the spring 331 and the force of the line pressure applied to the left land 33 through the line 1B which act on the spool 330 in one direction and the force of a solenoid pressure in a line 1H controlled by the second solenoid valve 72 and applied to the right land 335 of the spool 330 which acts on the spool in the other direction.

(c) When the line 1B is drained through the 2-3 shift control valve 31, the line 5, the manual selector valve 30 and the drain port 302 of the manual selector valve 30, if the second solenoid valve 72 is opened and thereby the solenoid pressure in the line 1H is in a low level, the spool 330 is positioned at the right side, whereby the lines 5 and 5C, the lines 2 and 2A, and the line 3C and the line 3D connected to the hydraulic servomotor B-1 are interconnected respectively, so that the second, the third and the fourth speed condition of the hydraulic circuit is established, where as if the second solenoid valve 72 is closed and thereby the solenoid pressure in the line 1H is in a high level, the spool 330 is positioned at the left position, whereby the lines 4C and 5C, the line 2A and the drain port 335, and the line 3D and the drain port 337 are interconnected respectively, so that the first speed condition of the hydraulic circuit is established.

(d) When the line pressure is supplied to the line 1B, the spool 330 is retained at the right position.

The 3-4 shift control valve 35 has a spool 350 and a spring 351 disposed on one side of the spool 350. The position of the spool 350 is dependent on the resilience of the spring 351 and the force of the line pressure applied to the left land 353 through the line 1A which act on the spool 350 in one direction and the force of the solenoid pressure in the line 1H applied to the right land 355 which acts on the spool in the other direction.

(e) When the line 1A is drained through the 2-3 shift control valve 31, the line 3, the manual selector valve 30 and the drain port 304 of the manual selector valve 30, if the second solenoid valve 72 is opened and therby the solenoid pressure in the line 1H is in a low level, the spool 350 is positioned at the right side position, the line 1 is connected to the line 1D connected to the hydraulic servomotor B-4 and the line 1R is connected to the drain port 354, so that the fourth speed condition of the hydraulic circuit is established, whereas if the solenoid valve 72 is closed and thereby the solenoid pressure in the line 1H is in a high level, the spool 350 is positioned at the left side position, whereby the line 1D is connected to the drain port 355 and the line 1 is connected to the line 1R, so that the third speed condition of the hydraulic circuit is established.

(f) While the line pressure is supplied to the line 1A, the spool 350 is retained at the right end position.

The low coast modulator valve 37 is interposed between the 2-3 shift control valve 31 and the 1-2 shift control valve 33 and is designed to reduce the line pressure to be supplied to the hydraulic servomotor of the brake B3 which is engaged when the shift lever is placed at the L-position by a predetermined degree.

The second coast modulator valve 39 is interposed between the 2-3 shift control valve 31 and the 1-2 shift control valve 33 and is designed to reduce the line pressure to be supplied to the hydraulic servomotor of the brake B1 when the shift lever is placed at the S-position by a predetermined degree.

The accumulator 51 is connected to the line 2 via the flow control valve 801 as well as to the line 2C connected to the hydraulic servomotor C-1 of the clutch C1. The accumulator 52 is connected to the line 1B connected to the line 1 via the 2-3 shift control valve 31, to the line 1B via the flow control valve 802 and to the line 1C connected to the hydraulic servomotor C-2 of the clutch C2. The accumulator 53 is connected to the line 2A connected to the line 2 via the 1-2 shift control valve 33 and to the line 2B connected to the hydraulic servomotor B-2 of the brake B2 via the flow control valve 803. The accumulator 54 is connected to the line 1D connected to the line 1 via the 3-4 shift control valve 35 via the flow control valve 804 and to the line 1E connected to the hydraulic servomotor B-4 of the brake B4. The accumulator 55 is connected to the line 1R connected to the line 1 via the 3-4 shift control valve 35 via the flow control valve 805 and to the line 1G connected to the hydraulic servomotor C-3 of the clutch C3. These accumulators function, together with the associated flow control valves, to regulate the respective pressure-rising speeds in the corresponding lines in order to appropriately control the respective rising characteristics of the pressures applied to the corresponding hydraulic servomotors, so that the clutches or the brakes are engaged smoothly and the timing of engagement is regulated appropriately. The output pressure of the accumulator control valve, namely, an accumulator control pressure, is applied through the line 1K to the respective spools of the accumulators 52, 53 and 55 as a back pressure.

The lockup signal valve 91 has a spool 910 and a spring 911 disposed on one side of the spool 910. The position of the spool 910 is dependent on the resilience of the spring 911 which acts on the spool 910 in one direction and the force of the solenoid pressure controlled by the third solenoid valve 73 and applied to the spool 910 through the line 1J connected to the line 1 via the orifice 805 which acts on the spool 910 in the other direction. Since the solenoid pressure in the line 1J is in a low level while the third solenoid valve 73 is open, the spool 910 is moved up, so that the lines 2A and 2D are interconnected. Since the solenoid pressure is in a high level while the solenoid valve 73 is closed, the spool 910 is moved down, so that the line 2D is connected to the drain port 915 and is drained.

The lockup clutch control valve 93 has a small diameter plunger 932, a spring 931 disposed on one side of the plunger 932 and a spool 930 disposed inseries with the plunger 932. The position of the spool 930 is dependent on the resilience of the spring 931 applied thereto through the plunger 932 and the force of the line pressure continually applied to the plunger through the line 1 which act on the spool in one direction and the force of the line pressure applied to the top land 937 through the line 2D which acts in the other direction. When the third solenoid valve 73 is opened and a pressure is produced in the line 2D, the spool 930 is moved down and thereby the lines 6 and 6B are interconnected and the line 6A is connected to the drain port 933, whereby the direct coupling clutch 106 is engaged. When the solenoid valve 73 is closed and thereby the line 2D is drained, the spool 930 is moved up and thereby the line 6 is connected to the line 6A, whereby the line 6B is connected to the cooler circuit 6C.

The cooler by-pass valve 62 is disposed within the cooler circuit 6C to relieve the pressure in the cooler circuit 6C when the pressure exceeds a predetermined level to protect the oil cooler.

The hydraulic controller described hereinbefore is controlled by the operation of the manual selector valve by the driver and by the output signals of the electronic controller, through the operation of the solenoid valves 71, 72 and 73 to carry out the automatic speed change of the automatic transmission shown in FIG. 1 through four forward speeds and one reverse speed as shown in TABLE 2.

TABLE 2

|   |   | Solenoid valves | | | Clutches | | | Brakes | | | | OWS | | |
|---|---|---|---|---|---|---|---|---|---|---|---|---|---|---|
|   |   | 71 | 72 | 73 | C1 | C2 | C3 | B1 | B2 | B3 | B4 | F1 | F2 | F3 |
| P |   | ○ | X | X | X | X | X | X | X | X | ○ | X | X | X |
| R |   | ○ | X | X | X | ○ | X | X | X | ○ | ○ | X | X | X |
| N |   | ○ | X | X | X | X | X | X | X | X | ○ | X | X | X |
| D | 1st | ○ | X | X | ○ | X | X | X | X | X | ○ | X | ○ | △ |
|   | 2nd | ○ | ○ | ○ | ○ | X | X | X | ○ | X | ○ | ○ | X | △ |
|   | 3rd | X | ○ | ○ | ○ | ○ | X | X | ○ | X | ○ | X | X | △ |
|   | 4th | X | X | ○ | ○ | ○ | ○ | X | ○ | X | X | X | X | X |
| S | 1st | ○ | X | X | ○ | X | X | X | X | X | ○ | X | ○ | △ |
|   | 2nd | ○ | ○ | ○ | ○ | X | X | ○ | ○ | X | ○ | △ | X | △ |
|   | 3rd | X | ○ | ○ | ○ | ○ | X | X | ○ | X | ○ | X | X | △ |
|   | (3rd) | X | X | X | ○ | ○ | X | X | ○ | X | ○ | X | X | △ |
| L | 1st | ○ | X | X | ○ | X | X | X | X | ○ | ○ | X | △ | △ |
|   | 2nd | ○ | ○ | X | ○ | X | X | ○ | ○ | X | ○ | △ | X | △ |

TABLE 2-continued

| Solenoid valves | | | Clutches | | | Brakes | | | | OWS | | |
|---|---|---|---|---|---|---|---|---|---|---|---|---|
| 71 | 72 | 73 | C1 | C2 | C3 | B1 | B2 | B3 | B4 | F1 | F2 | F3 |
| (1st) X | X | X | ○ | X | X | X | X | ○ | ○ | X | △ | △ |

In TABLE 2, symbols designate: ○ =solenoid valve open, clutch or brake engaged, one-way clutch locked, X=solenoid valve closed, clutch or brake released, one-way clutch free, ⊚ =direct coupling clutch engaged and △=one-way clutch free in coasting mode (running other than engine -driven running).

The function of the electronically controlled automatic transmission control system embodying the present invention at each shift position of the manual selector valve will be described hereunder.

(a) Function of the control system with the manual selector valve 30 in D-position.

As shown in TABLE 1, a line pressure is supplied from the line 2 through the flow control valve 801 and the line 2C to the hydraulic servomotor C-1 and thereby the clutch C1 is engaged. As shown in TABLE 2, while the vehicle is running with the transmission placed in the 1st drive ratio, the solenoid valve 71 is opened, the solenoid valve 72 is closed, the spool 330 of the 1-2 shift control valve 33 is shifted to the left side and since the lines 3D and 2A connected to the respective hydraulic servomotors of the brakes B1 and B2, respectively, are drained and no pressure is supplied to the line 5C connected to the hydraulic servomotor of the brake 3, the brakes B1, B2 and B3 are released. When the running speed of the vehicle reaches a predetermined running speed, a computer provides an output signal to open the solenoid valve 72, then, since the solenoid pressure in the line 1H, which is the control pressure of the 1-2 shift control valve, changes from a high level to a low level, the spool 330 of the 1-2 shift control valve 33 is moved to the right side and thereby the pressure is supplied from the line 2 through the 1-2 shift control valve 33, the line 2A, the flow control valve 803 and the line 2B to the hydraulic servomotor B-2 of the brake B2 to engage the brake B2, so that the transmission is upshifted to the 2nd drive ratio. The upshift operation of the transmission from the 2nd to the 3rd drive ratio is carried out when the running speed of the vehicle and the degree of throttle opening reach predetermined values respectively, in which the computer provides an output signal to close the solenoid valve 71 and thereby the spool 310 of the 2-3 shift control valve 31 is moved to the left side, the line pressure is supplied from the line 1 through the 2-3 shift control valve 31, the line 1B, the flow control valve 802 and the line 1C to the hydraulic servomotor of the clutch C2 to engage the clutch C2 and at the same time, the spool 330 of the 1-2 shift control valve 33 is retained at the right end position (2nd, 3rd and 4th drive position) by the line pressure applied to the left land 333 thereof through the line 1B. The upshift operation of the transmission from the 3rd to the 4th drive ratio is carried out in the similar procedure, in which the computer provides an output signal to open the solenoid valve 72 and thereby the solenoid pressure, which is the control pressure of the 3-4 shift control valve 35, in the line 1H applied to the right land 355 of the 3-4 shift control valve 35 changes from a high level to a low level, so that the spool 350 of the 3-4 shift control valve 35 is moved to the right side, the line 1R is drained, the line pressure is supplied to the line 1D, the clutch C3 is released and the brake B4 is engaged.

(b) Function of the control system with the manual selector valve 30 in S-position.

As indicated in TABLE 1, the line pressure is supplied to the line 3 in addition to the line 2. The transmission is placed in the 1st drive ratio and then upshifted to the 2nd drive ratio and then to the 3rd drive ratio according to the running speed of the vehicle similarly to the manner described in the above paragraph (a). However, since the line pressure is supplied from the line 1 through the 2-3 shift control valve 31 and the line 1A to the left land 353 of the spool 350 of the 3-4 shift control valve to retain the spool 350 at the left end position, the transmission will not be upshifted to the 4th drive ratio. In case the manual selector valve 30 is shifted manually from the D-position to the S-position while the vehicle is running with the manual selector valve 30 placed in the D-position and with the transmission placed in the 4th drive ratio, the line pressure is applied to the left land 353 of the spool 350 of the 3-4 shift control valve as described above, whereby the transmission is downshifted immediately to the 2nd drive ratio. In this case, the low coast modulator pressure is supplied from the line 3 through the 2-3 shift control valve 31, the line 3A, the low coast modulator valve 39, the orifice 807, the 1-2 shift control valve 33 and the line 3D to the hydraulic servomotor B-1 of the brake B1, whereby the brake B1 is engaged moderately and the transmission is placed in the 2nd drive ratio, in which engine braking is effective.

(c) Function of the control system with the manual selector valve 30 placed in the L-position.

The line pressure is supplied also to the line 4 in addition to the lines 2 and 3. The transmission is placed in the 1st drive ratio similarly to the manner executed when the manual selector valve 30 is placed in the D-position, in which the spool 310 of the 2-3 shift control valve 31 is retained at the right end position. While the transmission is placed in the 1st drive ratio, the second coast modulator pressure is supplied from the line 4 through the 2-3 shift control valve 31, the line 4A, the second coast modulator valve 37, the line 4B, the 1-2 shift control valve 33 and the line 5C to the hydraulic servomotor B-3 of the brake B3, so that the brake B3 is engaged and engine brake is applicable. When the manual selector valve 30 is shifted manually to S-position while the vehicle is running with the transmission placed in the 3rd drive ratio, the computer provides an output signal to open the solenoid valve 71 after the running speed of the vehicle has been reduced to a predetermined running speed, so that the transmission is downshifted from the 3rd drive ratio to the 2nd drive ratio.

(d) Function of the control system with the manual selector valve placed in the N- or P-position.

The line pressure is not supplied to any of the lines 2, 3, 4 and 5, the first solenoid valve 71 is opened, the second solenoid valve 72 is closed, the line pressure in the line 1H connected to the line 1 through the orifice 806 is applied to the respective right lands 335 and 355 of the spools of the 1-2 shift control valve 33 and the 3-4 shift control valve 35, respectively, the spool 330 is retained at the left end position (1st side), the spool 350 is retained at the right end position (1st, 3rd side) due to the application of the line pressure to the left land 353 from the line 1 through the 2-3 shift control valve 31 and the line 1A, the line pressure is supplied from the line 1 through the 3-4 shift control valve 35, the line 1D, the flow control valve 804 and the line 1E to the hydraulic servomotor B-4 of the brake B4, so that only the brake B4 is engaged and the transmission is placed in the neutral position.

(e) Function of the control system with the manual selector valve placed in the R-position.

The line 1 is connected to the line 5, the lines 3 and 4 are drained, the first solenoid valve 71 is opened and the second solenoid valve 72 is closed. Since the spool of the 2-3 shift control valve 31 is retained at the right end position and the line pressure is supplied to the lines 1B and 1A, the respective spools 330 and 350 of the 1-2 shift control valve 33 and the 3-4 shift control valve 35 are retained at the respective right end positions, so that the clutch C2 and brakes B3 and B4 are engaged, whereby the transmission is placed in the reverse drive position.

When the manual selector valve 30 is placed either in the D-position or in L-position, the line pressure is supplied to the line 2 and the 1-2 shift control valve 33 is placed in the 2nd drive position, the line pressure is supplied to the line 2A and the line pressure is applied to the top land 937 of the spool of the lockup control valve 93. When the third solenoid valve 73 is opened and thereby the pressure in the line 1J is in a low level, the spool 910 of the lockup signal valve is located at the upper position, whereby the spool 930 of the lockup control valve 93 is moved down to connect the line 6 to the line 6B, so that the lockup clutch 106 built in the fluid coupling 100 is engaged and the fluid coupling is placed in the state of direct coupling. Either when the line pressure is supplied to the line 2A or when the line pressure is supplied to the line 2A and yet the solenoid valve 73 is closed to produce a solenoid pressure of a high level in the line 1J so that the line 2D is drained through the drain port 915, the spool 930 is located at the higher position by the agency of the resilience of the spring 931 and the line pressure applied to the plunger 932. While the spool 930 is located at the higher position, the line 6 is connected to the line 6A and thereby the direct coupling clutch 106 of the fluid coupling is released. The operation of the solenoid valve 73 is controlled by a computer, which will be described afterward, and the solenoid of the solenoid valve 73 is excited when the degree of throttle opening is above a predetermined value.

Figure 3:
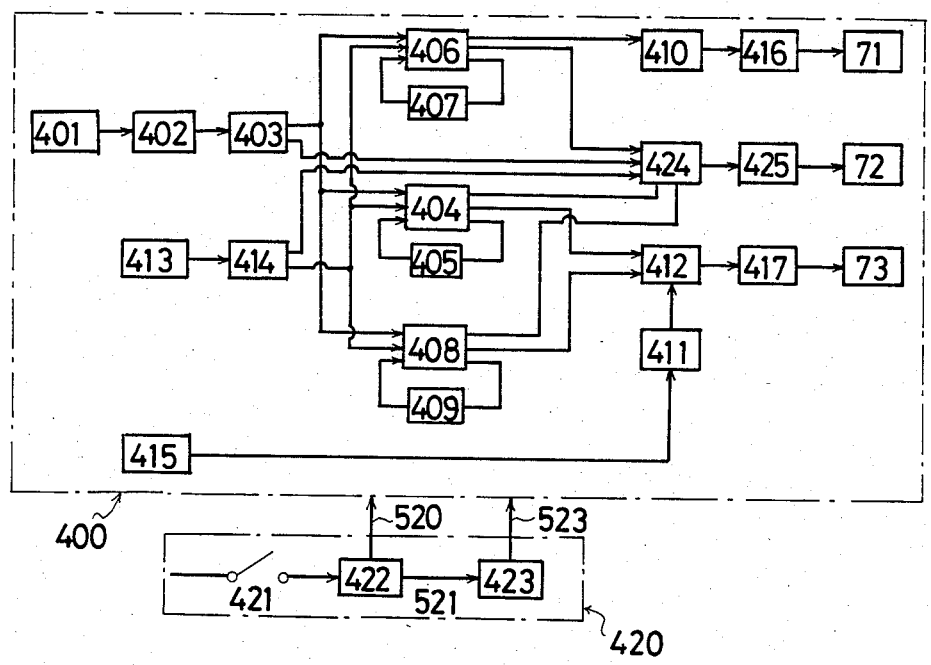
FIG. 3 is a block diagram of an electronic controller.

An electronic control circuit (a computer) for controlling the first solenoid valve 71, the second solenoid valve 72 and the third solenoid valve 73 as indicated in TABLE 2 corresponding to the running conditions of the vehicle will be described below in connection with FIG. 3.

The electronic control circuit consists of a power circuit 420 and a computing circuit 400 for detecting the running speed of the vehicle and the degree of throttle opening and for driving the solenoid valves 71, 72 and 73. The power circuit 420 is connected through a switch 421 to a battery. A position switch 422 associated with the shift lever is connected electrically to a D, S and L-position setting circuit through a line 520 and to a power supply 423 (a constant-voltage regulated power supply) through a line 521. The power supply 423 supplies electricity of a constant voltage through a line 523 to the components of the computing circuit 400. The computing circuit 400 consists of a speed detecting circuit 401, a waveform shaping and amplifying circuit 402, a DA converter (a digital-to=analog converter) 403, a throttle position switch 413, a throttle voltage generating circuit 414, a 2-3 shift discriminating circuit 406, a 3-4 shift discriminating circuit 408, a hysteresis circuits 405, 407 and 409, a decision circuit 410 for controlling the operating mode of the solenoid valve 71, a decision circuit 4 controlling the operating mode of the solenoid valve 73, a decision circuit 424 for controlling the operating mode of the solenoid valve 72, an N-D shift signal genarating circuit 415, a timer 411, amplifiers 416, 417 and 425 and the solenoid valves 71, 72 and 73. The running speed of the vehicle is detected by the speed detecting circuit 401 in the form of a sinusoidal wave signal. The sinusoidal wave signal is shaped and amplified by the waveform shaping and amplifying circuit 402 in a positive square wave signal and then the positive square wave signal is converted into a DC voltage signal corresponding to the running speed by the DA converter 403. The throttle position switch 413 for detecting the load condition of the engine is formed of a variable resistor capable of providing a resistance corresponding to the degree of throttle opening. A signal corresponding to the degree of throttle opening is converted into a DC voltage signal by the throttle voltage generating circuit 414 and is applied to the 1-2 shift discriminating circuit 404, the 2-3 shift discriminating circuit 406 and the 3-4 shift discriminating circuit 408. Each discriminating circuit compares the magnitude between the voltage signal representing the running speed and the voltage signal representing the degree of throttle opening by means of, for instance, a differential amplifier and sets a condition for 1-2 shift, 2-3 shift or 3-4 shift. The hysteresis circuits 405, 407 and 409 determine conditions of 2-1, 3-2 and 4-3 downshift operations respectively. Each downshift operation is performed at a running speed which is somewhat lower than the running speed for the corresponding upshift operation to prevent hunting within the speed change range. The decision circuit 410 for controlling the solenoid valve 71 provides an output signal or "0" (OFF) of "1" (ON) upon the reception of the output signal of the 2-3 shift discriminating circuit. The solenoid valve 71 is opened or closed by the output signal of the 2-3 shift discriminating circuit through the amplifier 416. The decision circuit 424 for controlling the solenoid valve 72 provides an output signal of "0" of "1" depending on the respective output signals of the 1-2 shift discriminating circuit 404, the 3-4 shift discriminating circuit 408 and the N-D shift signal generator which is applied to the decision circuit 412 through the timer 411 to open or close the solenoid valve 73 through the amplifier 417. The decision circuit 424 for controlling the solenoid valve 72 receives the respective output signals of the 1-2 shift discriminating circuit 404, the 2-3 shift discriminating circuit 406 and the 3-4 shift discriminating circuit 408 to open or close the solenoid valve 72 through the amplifier 425 when the running speed of the vehicle and the degree of throttle opening become programmed values, respectively, while the vehicle is running with the transmission placed in the 2nd drive ratio or higher.

In this constitution, change in the running conditions in each drive ratio corresponding to the position of the manual selector valve is as follows:

(A) 1st drive ratio: The first solenoid valve 71 is energized and the second solenoid valve 72 is not energized.
D-position
(1) Engine brake is not applicable.
S-position
(1) The same as in D-position.

(2) Since the pressure in the line 4 is applied to the left land 313 of the spool 310 of the 2-3 shift control valve 31, the spool 310 is retained at the right end position (1st, 2nd side) irrespective of the condition of the first solenoid valve 71.

L-position
- (1) The same as in S-position.
- (2) the same as in S-position
- (3) The transmission is placed in the 1st drive ratio by (2) irrespective of the condition of the first solenoid valve 71. Accordingly, the vehicle can start with the transmission placed in the 1st drive ratio by placing the manual selector valve in the L-position in the case of malfunction of the computing circuit.

(B) 2nd drive ratio: Both the first solenoid valve 71 and the second solenoid valve 72 are energized.

D-position
- (1) Engine brake is not applicable.

S-position
- (1) Since the brake B1 is engaged, engine brake is not applicable.

L-position
- (1) The same as in the S-position.

(C) 3rd drive ratio: the first solenoid valve 71 is not energized and the second solenoid valve 72 is energized.

D-position
- (1) Engine brake is applicable.

S-position
- (1) The same as in the D-position.
- (2) Since the pressure in the line 3 is applied through the 2-3 shift control valve 31 and the line 1A to the left land of the spool 350 of the 3-4 shift control valve 35, the transmission is maintained in the 3rd drive ratio irrespective of the condition of the second solenoid valve 72. Accordingly, the transmission is placed in the 3rd drive ratio when the computing circuit malfunctions.

(D) 4th drive ratio: Both the first solenoid valve 71 and the second solenoid valve 72 are not energized. Engine brake is applicable only when the manual selector valve is placed in the D-position.

The running conditions described above are tabulated in TABLE 3.

TABLE 3

| Manual selector valve | Drive ratio | Computer malfunction |
|---|---|---|
| D-position | 1st-2nd-(3rd)-(4th) | 4th |
| S-position | 1st-(2nd)-(3rd) | 3rd |
| L-position | (1st)-(2nd) | 1st |

Note: In the drive ratio in parentheses, engine brake is applicable.

Since the D-position pressure (the pressure in the line 2 when the manual selector valve 30 is placed in the D-position) is supplied to the second solenoid valve 72 in a conventional hydraulic control circuit, such a hydraulic control circuit has the following problems.

When the manual selector valve is placed in the N- or P-position, the spool 330 of the 1-2 shift control valve 33 is biased to the right by the resilience of the spring 331. The line 2 is connected through the 1-2 shift control valve 33 to the line 2A and, at the same time, is drained through the manual selector valve 30. Since the line 1H connected to the second solenoid valve 72 is connected through the orifice 806 to the line 2, the line 1H also is drained.

In such a hydraulic control circuit, when the manual selector valve 30 is shifted from the N-position to the D-position, the line pressure is supplied from the line 1 through the manual selector valve 30 to the line 2 and then the pressure in the line 2 is supplied to the hydraulic servomotor of the clutch C1, the first solenoid valve 71, the second solenoid valve 72 and the 1-2 shift control valve 33.

Figure 4:
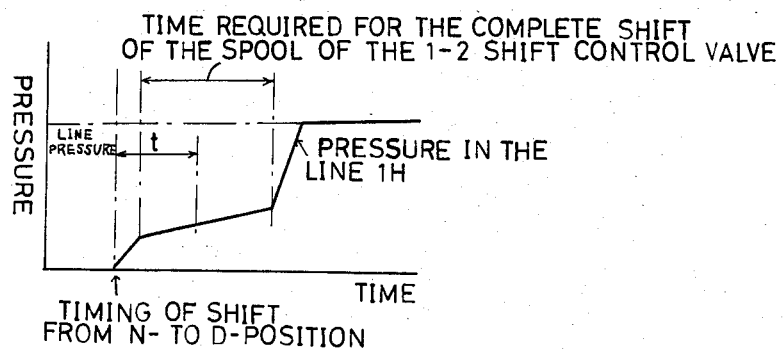
FIGS. 4 and 5 are graphical representations showing the respective variations of the fluid pressure and the torque of the output shaft with time when the manual selector valve is shifted from the N-position to the D-position.

The pressure supplied to the second solenoid valve 72 is supplied through the orifice 806 to the line 1H, however, since the second solenoid valve 72 is closed to place the transmission in the 1st drive ratio when the manual selector valve is shifted from the N- to the D-position, the line 1H is blocked. Consequently, the pressure in the line 1H rises gradually as shown in FIG. 4 by the agency of the orifice 806 and moves the spool 330 of the 1-2 shift control valve against the resilient force of the spring 331 from the right end position (position in the N- and P-position) to the left end position (position in the D-position and the 1st drive ratio). On the other hand, the line pressure supplied from the line 2 to the 1-2 shift control valve is supplied to the line 2A while the spool 330 of the 1-2 shift control valve is located at the right end position. Consequently, the line pressure in the line 2 drops as indicated by continuous line in FIG. 5. After a fixed period of time, the spool 330 of the 1-2 shift control valve 33 moves leftward and thereby the line 2 is blocked from the line 2A and then the pressure drop in the line 2 is stopped and the pressure in the line 2 is restored to the line pressure.

Figure 5:
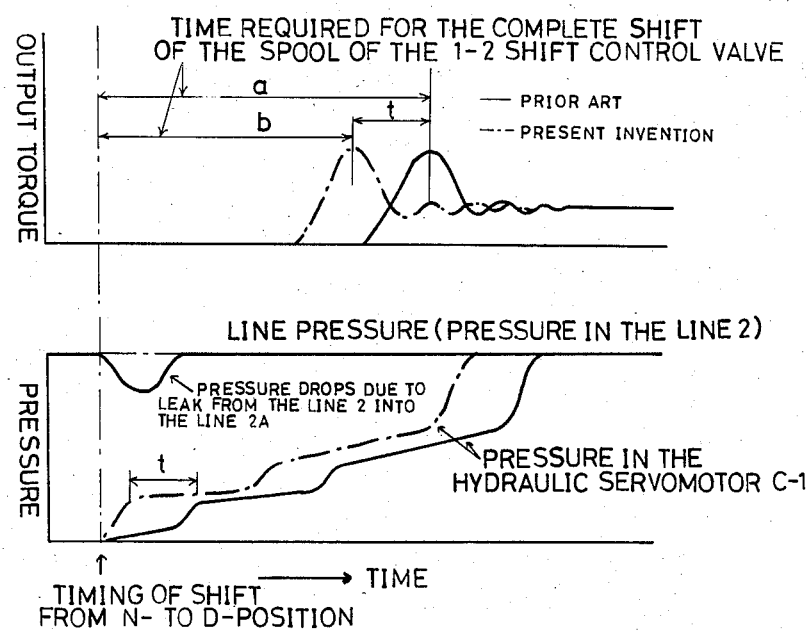

Such temporary pressure drop in the line 2 as described above causes delayed pressure rise in the hydraulic servomotor C-1 of the clutch C1 as indicated by continuous line in FIG. 5, therefore, a seconds is required to engage the clutch C1.

According to the present invention, the line pressure is supplied to the second solenoid valve 72 from the line 1 and hence the spool 330 of the 1-2 shift control valve 33 is retained at the left end position while the manual selector valve is placed in the N-position, so that pressure drop in the line 2 is prevented even when the manual selector valve is shifted from the N- to the D-position and the pressure rise in the hydraulic servomotor C-1 of the clutch C1 is improved as indicated by broken line in FIG. 5 and thereby the time required for engaging the clutch C1 becomes b seconds, which is shorter by t seconds than a seconds.

As describe hereinbefore, an electronically controlled automatic transmission control system of the present invention comprises:

an electronic controller which receives and functions on the basis of input signals corresponding to the running speed of the vehicle, such as the running speed of the vehicle and the degree of throttle opening; and a hydraulic controller including a fluid pressure source, shift control valves for changing over the connection of said fluid pressure source to the respective hydraulic servomotors of frictional engaging mechanisms which engage, release or fix the components of a gear train, solenoid valves adapted to be controlled by the electronic controller to change input signal pressures to the shift control valves and a manual selector valve capable of moving through predetermined set positions, namely, a neutral position (N-position), a drive position (D-position) and a reverse position (R-position) and adapted to connect the fluid pressure source selectively to the shift control valves or the hydraulic servomechanisms; and adapted to control the automatic transmission according to the runnig conditions of the vehicle including the set position of the manual selector valve, wherein the input signal pressure is supplied to the 1-2 shift control valve when the manual selector valve is placed in the N-position. Accordingly, the electronically controlled automatic transmission control system of the present invention is capable of starting the vehicle within a short response time when the manual selector valve is shifted from the N-position to the D-position and, thereby, is capable of providing improved driving performance.

We claim:

1. An electronically controlled automatic transmission control system for controlling an automatic transmission for a vehicle comprising:
    an electronic controller which receives and functions in response to input signals corresponding to the running conditions of the vehicle, such as running speed of the vehicle and degree of throttle opening and;
    a hydraulic controller including a fluid pressure source, shift control valves for changing over connection of said fluid pressure source to respective hydraulic servomotors of frictional engaging mechanisms which engage, release or fix components of a gear train, solenoid valves adapted to be controlled by said electronic controller to change input signal pressures to said shift control valve and a manual selector valve capable of moving through predetermined set positions, namely, a neutral position (N-position), a drive position (D-position) and a reverse position (R-position) and adapted to connect said fluid pressure source selectively to said shift valves or said hydraulic servomotors; and adapted to control the automatic transmission according to running of the vehicle including the set position of said manual selector valve, said solenoid valves being a first solenoid valve and a second solenoid valve, said shift control valves being first, second and third shift control valves, said first shift control valve being operated by said first solenoid valve to supply the pressurized fluid to or to drain the pressurized fluid from a predetermined hydraulic servomotor, said second and said third shift control valves being operated by said first shift control valve and said second solenoid valve so that said second shift control vlave is controlled according to an opening and closing operation of said second solenoid valve when a valve element of said first shift control valve is placed at one side of said first shift control valve due to an opening or closing operation of said first solenoid valve and said third shift control valve is controlled by the opening and closing operation of said second solenoid valve when valve element of said first shift control valve is placed at another side of said first shift control vlave due to closing or opening operation of said first solenoid valve, wherein when the manual selector valve is placed at the N-position, said input signal pressure is supplied to a 1-2 shift contol valve and the 1-2 shift control valve is held in a position for a first drive ratio.

2. An automatic transmission control system according to claim 1, wherein said automatic transmission has four forward gear ratios and one reverse gear ratio, said first shift control valve is a 2-3 shift control valve, said second shift control valve is a 1-2 shift contol valve and said third shift control valve is a 3-4 shift control valve.

* * * * *